United States Patent
Langer et al.

(10) Patent No.: US 8,870,489 B2
(45) Date of Patent: Oct. 28, 2014

(54) DEVICE FOR THE ROTATIONALLY FIXED CONNECTION OF A PIN OF A GEARBOX TO AN ARTICULATED BODY OF A DRIVE COUPLING OF A DRIVE SHAFT

(75) Inventors: Gerald Langer, Bülstringen (DE); John Sherlock, Wolverhampton (GB)

(73) Assignee: IFA-Technologies GmbH, Haldensleben (DE)

( * ) Notice: Subject to any disclaimer, the term of this patent is extended or adjusted under 35 U.S.C. 154(b) by 83 days.

(21) Appl. No.: 12/451,912

(22) PCT Filed: Jun. 1, 2008

(86) PCT No.: PCT/DE2008/000902
§ 371 (c)(1),
(2), (4) Date: Jan. 4, 2010

(87) PCT Pub. No.: WO2008/148373
PCT Pub. Date: Dec. 11, 2008

(65) Prior Publication Data
US 2010/0119301 A1 May 13, 2010

(30) Foreign Application Priority Data

Jun. 4, 2007 (DE) .......................... 10 2007 026 040

(51) Int. Cl.
*B25G 3/28* (2006.01)
*F16D 1/108* (2006.01)
*F16D 1/10* (2006.01)

(52) U.S. Cl.
CPC .......... *F16D 1/108* (2013.01); *F16D 2001/103* (2013.01)

USPC ......... 403/359.5; 403/317; 403/342; 180/344

(58) Field of Classification Search
USPC ........ 403/359.1, 359.5, 359.6, 317, 319, 342; 180/337, 344
See application file for complete search history.

(56) References Cited

U.S. PATENT DOCUMENTS 1,707,353 A * 4/1929 Fraser ........................... 403/354
3,588,154 A * 6/1971 Voight ........................... 403/300

(Continued)

FOREIGN PATENT DOCUMENTS

DE 4419342 7/1995
DE 103 44 703 4/2005

(Continued)

OTHER PUBLICATIONS

Article by W. Beitz and K.-H. Kütter "Taschen-buch für den Maschinenbau", Dubbel 1986, pp. 406-407.

*Primary Examiner* — Michael P Ferguson
*Assistant Examiner* — Jonathan Masinick
(74) *Attorney, Agent, or Firm* — Horst M. Kasper

(57) ABSTRACT

The invention relates to a device (1, 1') for the rotationally fixed connection of a drive-effective pin (3) of a gearbox to an articulated body (2) of a drive coupling of a drive shaft. In order to allow cost-effective and compact production and in order to simplify assembly and disassembly, the invention provides for the pin (3) and the articulated body (2) of the drive coupling to have respective mutually corresponding external axial toothings (11) and internal axial toothings (8) which are able to mesh with one another, and for an axial securing of the articulated body (2) and the pin (3) to be made possible by an axially displaceable bushing (12) arranged on the pin (3), which bushing (12) can be attached to a connecting portion (4) of the articulated body (2).

12 Claims, 4 Drawing Sheets

(56) References Cited

U.S. PATENT DOCUMENTS

Figure 1:
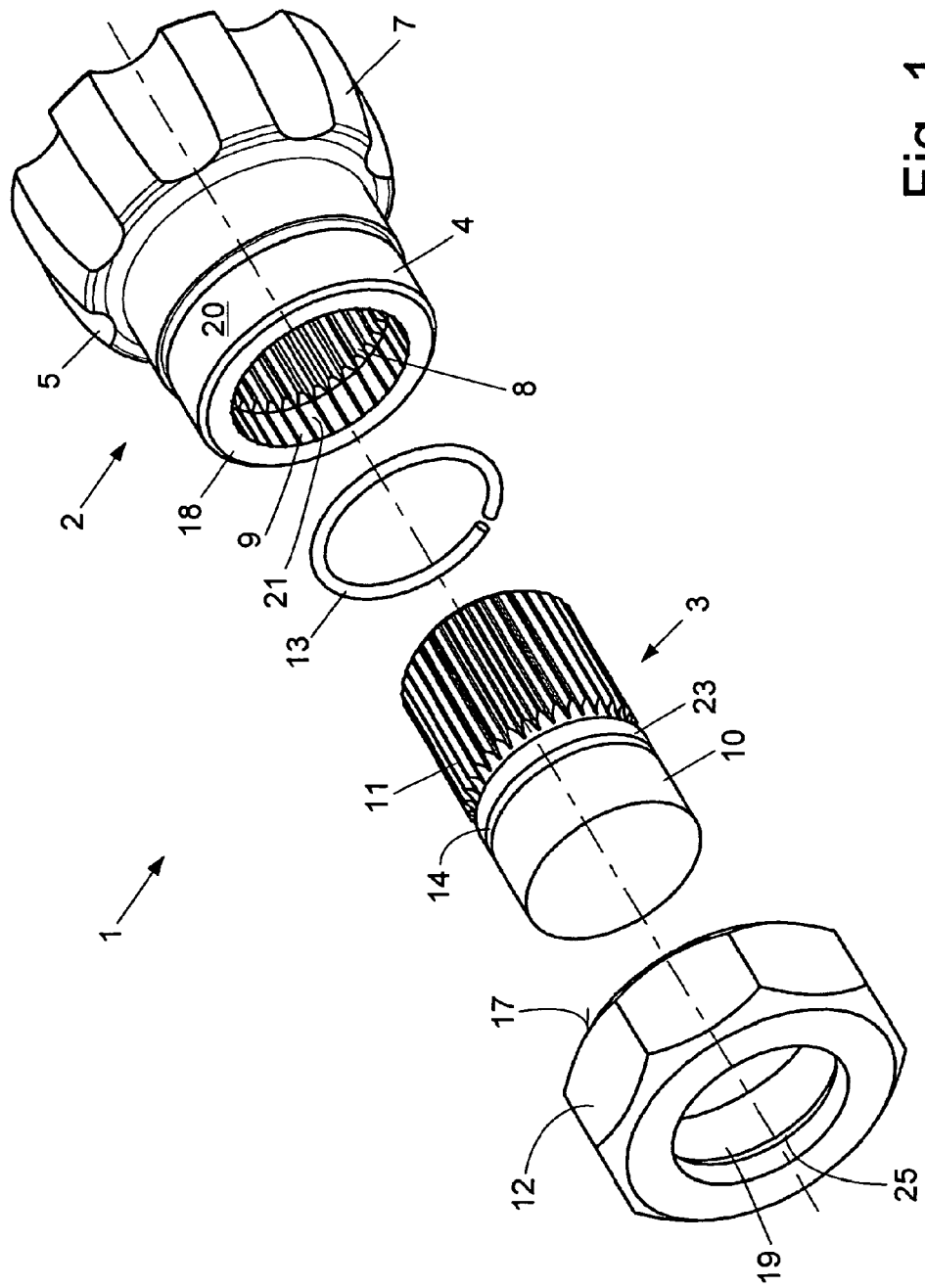

| | | | |
|---|---|---|---|
| 3,596,478 A | 8/1971 | Komuzin | |
| 3,969,033 A * | 7/1976 | Recker | 403/322.2 |
| 4,318,306 A * | 3/1982 | Fischer | 74/433 |
| 4,616,952 A * | 10/1986 | Schott | 403/316 |
| 4,813,808 A * | 3/1989 | Gehrke | 403/326 |
| 4,880,085 A * | 11/1989 | Taylor | 188/79.55 |
| 4,943,182 A * | 7/1990 | Hoblingre | 403/349 |
| 5,172,447 A * | 12/1992 | Tomm | 15/159.1 |
| 5,632,568 A * | 5/1997 | Fechter | 403/328 |
| 6,009,609 A * | 1/2000 | Hanno | 29/401.1 |
| 6,186,697 B1 * | 2/2001 | Masuda et al. | 403/359.5 |
| 6,390,925 B1 * | 5/2002 | Perrow | 464/111 |
| 7,073,797 B2 * | 7/2006 | Gaul | 279/8 |
| 7,112,905 B2 * | 9/2006 | Chang et al. | 310/112 |
| 7,481,711 B2 * | 1/2009 | Fukumura et al. | 464/182 |
| 7,574,945 B2 * | 8/2009 | Kondo | 74/724 |
| 7,946,374 B2 * | 5/2011 | Kofuji | 180/226 |
| 8,047,919 B2 * | 11/2011 | Arden et al. | 464/32 |
| 8,092,312 B2 * | 1/2012 | Duncan | 464/134 |
| 8,322,941 B2 * | 12/2012 | Cermak | 403/359.5 |
| 2001/0016520 A1 * | 8/2001 | Sahashi et al. | 464/182 |

FOREIGN PATENT DOCUMENTS

| | | |
|---|---|---|
| DE | 10342497 | 4/2005 |
| DE | 10343749 | 4/2005 |
| DE | 102004048079 | 4/2006 |
| EP | 1519063 | 3/2005 |

* cited by examiner

DEVICE FOR THE ROTATIONALLY FIXED CONNECTION OF A PIN OF A GEARBOX TO AN ARTICULATED BODY OF A DRIVE COUPLING OF A DRIVE SHAFT

The invention relates to a device for the rotationally fixed connection of a drive-effective pin of a gearbox to an articulated body of a drive coupling of a drive shaft.

Drive trains usually comprise a drive engine and at least one gearbox which are drivingly connected to one another by means of shafts. In motor vehicles the drive shaft of the drive engine drives an input shaft of a gearbox, which may be in the form, for example, of a multi-step or stepless gearbox, via a starting element, for example a friction clutch or a hydrodynamic torque converter. The at least one output shaft of said gearbox is connected to an input element of a differential gear from which emerge axle drive shafts with which associated vehicle wheels are drivable. If the drive engine and the gearbox are arranged at the front of the motor vehicle and the vehicle has rear-wheel or all-wheel drive, a drive shaft, also referred to as a propeller shaft, leads from the gearbox output shaft to the differential gear arranged in the region of the rear axle. In order to compensate for the different installed positions in the vehicle with respect to all three spatial axes, such axle drive shafts or propeller shafts have drive couplings which make possible problem-free transmission of the torque delivered by the drive engine.

In the production of a motor vehicle the rotationally fixed connection of two shafts in a drive train cannot always be carried out without difficulty because of confined installation conditions. For this reason the drive engine and the gearbox are usually assembled together as the power train prior to installation in the motor vehicle and are then fastened to supporting parts of the vehicle. In the case of power trains installed at the front of a vehicle with rear-wheel drive or all-wheel drive, the differential gear is also fastened to the vehicle and only then is the propeller shaft connected in a rotationally fixed manner to the gearbox output shaft and the input element or a pin of the differential gear.

The means for drivingly connecting the propeller shaft to the gearbox output shaft and to the input element of the differential gear must be configured such that they can be disconnected at any time, for example in a workshop, to make possible a repair of components of this drive train. In the case of known drive shafts and propeller shafts the aforementioned rotationally fixed connection is effected, for example, by means of a fastening flange on the respective ends of the propeller shaft and of the pin of the differential gear, which are located flush against one another and through the axial bores of which screws are inserted.

Furthermore, DE 44 19 342 C1 describes a device for connecting two shafts the end faces of which are in flush abutment with one another. In order to connect the two shafts it is provided in this document that the device consists of two clamping sleeves which are screwed to one another axially by means of threads, each clamping sleeve being associated with and bearing axially against a respective shaft. On their end faces which bear against one another the shafts each have a collar of predetermined axial length projecting from their outer periphery, the collars being provided with torque transmitting means on their outer faces. The first clamping sleeve has a bore which is provided with torque-transmitting means which can be brought axially into form-fitting engagement with the torque transmitting means of the collars, and further has a surface provided with a thread. The second clamping sleeve is provided with a thread which fits the thread of the first clamping sleeve. Apart from the fact that the forming of additional collars on the end faces of the shafts entails high complexity and cost, this shaft coupling has a comparatively large diameter because of its design structure.

Against this background it is the object of the invention to provide a device for the rotationally fixed connection of a drive pin of a gearbox to an articulated body of a drive coupling of a drive shaft which can be produced at low cost, which simplifies assembly and disassembly of the parts to be connected, makes possible reliable transmission of torque and has a comparatively small diameter.

This object is achieved by the features of the main claim, while advantageous configurations and developments of the invention are apparent from the dependent claims.

According to the features of the main claim, therefore, the invention relates to a device for the rotationally fixed connection of a drive-effective pin of a gearbox to an articulated body of a drive coupling of a drive shaft. In order to achieve the set object, it is provided with this device that the pin and the articulated body of the drive coupling have mutually corresponding respective external axial toothings and internal axial toothings which are able to mesh together, and that axial securing of articulated body and pin is made possible by an axially displaceable bushing arranged on the pin which can be fastened to a connecting portion of the articulated body.

It should be pointed out here that the drive-effective pin may be, for example, the axial end of an input shaft of a gearbox with variable ratio, or a drive-effective pin of a differential gear.

According to an especially advantageous configuration it is provided that the pin has a displacement portion and an end portion with an external axial toothing, that a circumferential groove in which a circlip is arranged is formed between the displacement portion and the external axial toothing, that the circlip forms an axial stop for a bushing arranged on the displacement portion and for an end face of the hollow-cylindrical articulated body, that the bushing can be positioned on a connecting portion of the articulated body remote from its track in order to connect the pin to the articulated body, that an internal axial toothing is formed in the hollow-cylindrical opening of the articulated body to receive the external axial toothing of the pin, and that a radially inner cylindrical surface of the bushing is connectable non-positively and/or positively to a radially outer cylindrical surface of the articulated body.

The structure of the device according to the invention makes possible rapid and simple assembly and disassembly of the propeller shaft to and from the transmission, in particular to and from a differential gear, without it being necessary for this purpose to tighten a plurality of screws at locations which are difficult to access, as is otherwise usual.

The circlip represents a simple but precise axial delimitation and axial stop for the bushing on the articulated body. In this case the bushing may be in the form of a screw socket which can be screwed with a corresponding thread to the outer surface of the articulated body as axial protection against unintended pulling apart of the drive connection. After the bushing has been slid onto the pin and the circlip has then been inserted in its circumferential groove on the pin, the articulated body of the drive shaft is placed against the pin and the bushing is connected to the articulated body. Time-consuming and costly screw-assembly of a plurality of separate studs is thereby dispensed with.

In addition, the device according to the invention is significantly more space-saving and cost-effective than conventional devices for the rotationally fixed and axially secured connection of a propeller shaft to a transmission, in particular to a differential gear. Furthermore, a weight reduction can also be achieved with a device configured according to the invention.

Moreover, it may be provided that the radially inner cylindrical surface of the bushing and the radially outer cylindrical surface of the articulated body are provided with respective mutually corresponding screw threads.

Alternatively, it may be provided that the radially inner cylindrical surface of the bushing and the radially outer cylindrical surface of the articulated body are provided with a respective mutually corresponding bayonet connection, or it may be provided that the radially inner cylindrical surface of the bushing and the radially outer cylindrical surface of the articulated body are connected to one another by a press-fit connection which can be released non-destructively by the application of a large force.

In other practical developments it may be provided that the circlip is in the form of a spring ring, a Seeger ring or an O-ring. The use of an O-ring, for example made of a rubber-elastic material, is possible because it does not have to absorb large axial forces acting on one side and at the same time it has a sealing effect in the direction of the drive coupling.

According to an advantageous development of the invention it is provided that the circlip preferably has an angular cross section or a round or oval cross section. The circlip is so dimensioned in relation to the forces acting thereon that, firstly, it securely ensures the axial connection of pin and articulated body and, secondly, it requires a receiving groove as shallow as possible in the pin, whereby the mechanical strength of the pin is not reduced in an undesired manner.

Thus, it is preferably provided that the radial depth of the circumferential groove in the pin is less than half the radial extension of the material of the circlip. It is further preferably provided that the circlip can be received completely on its radially outer side, and at least partially in the axial direction, in an opening of the bushing.

Finally, it should be pointed out that the articulated body referred to multiple times may be in the form of a coupling inner part or a coupling outer part, that is, a hub or a bell of a drive coupling, which each have tracks for rolling bodies in known fashion.

Figure 2:
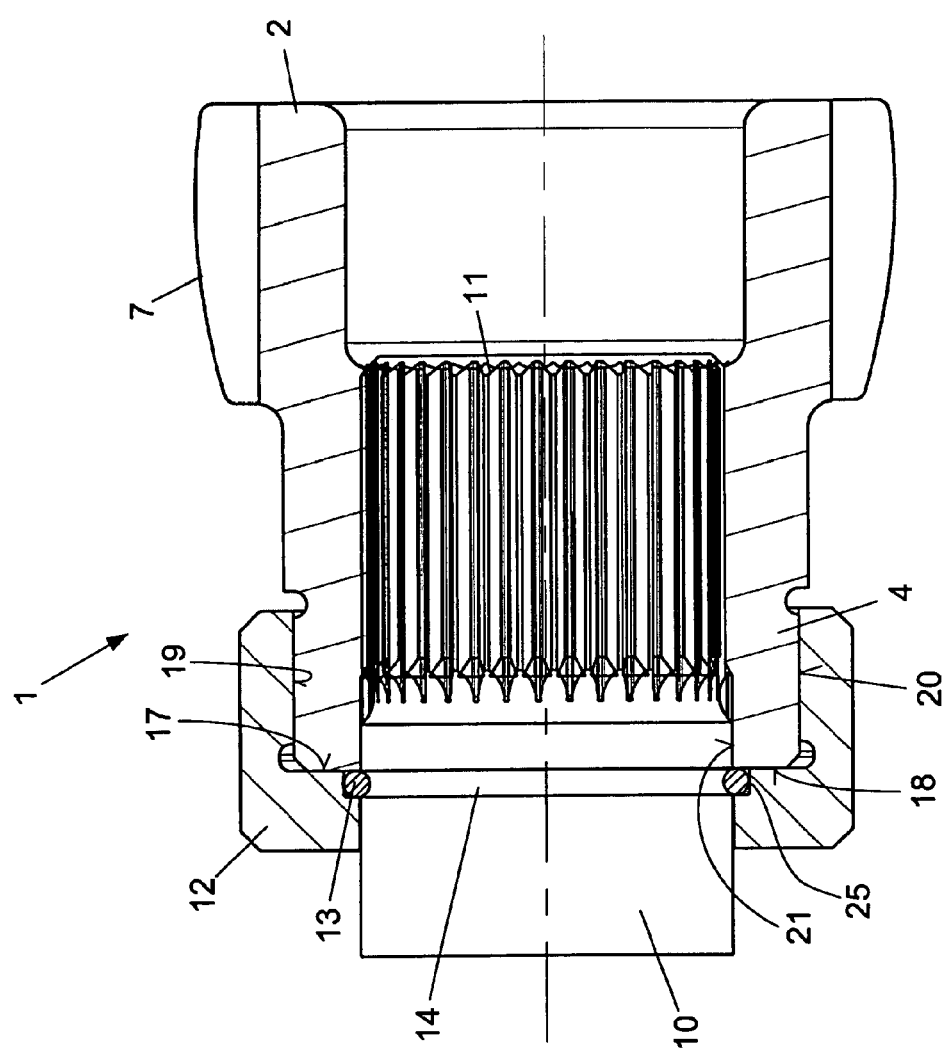
Figure 3:
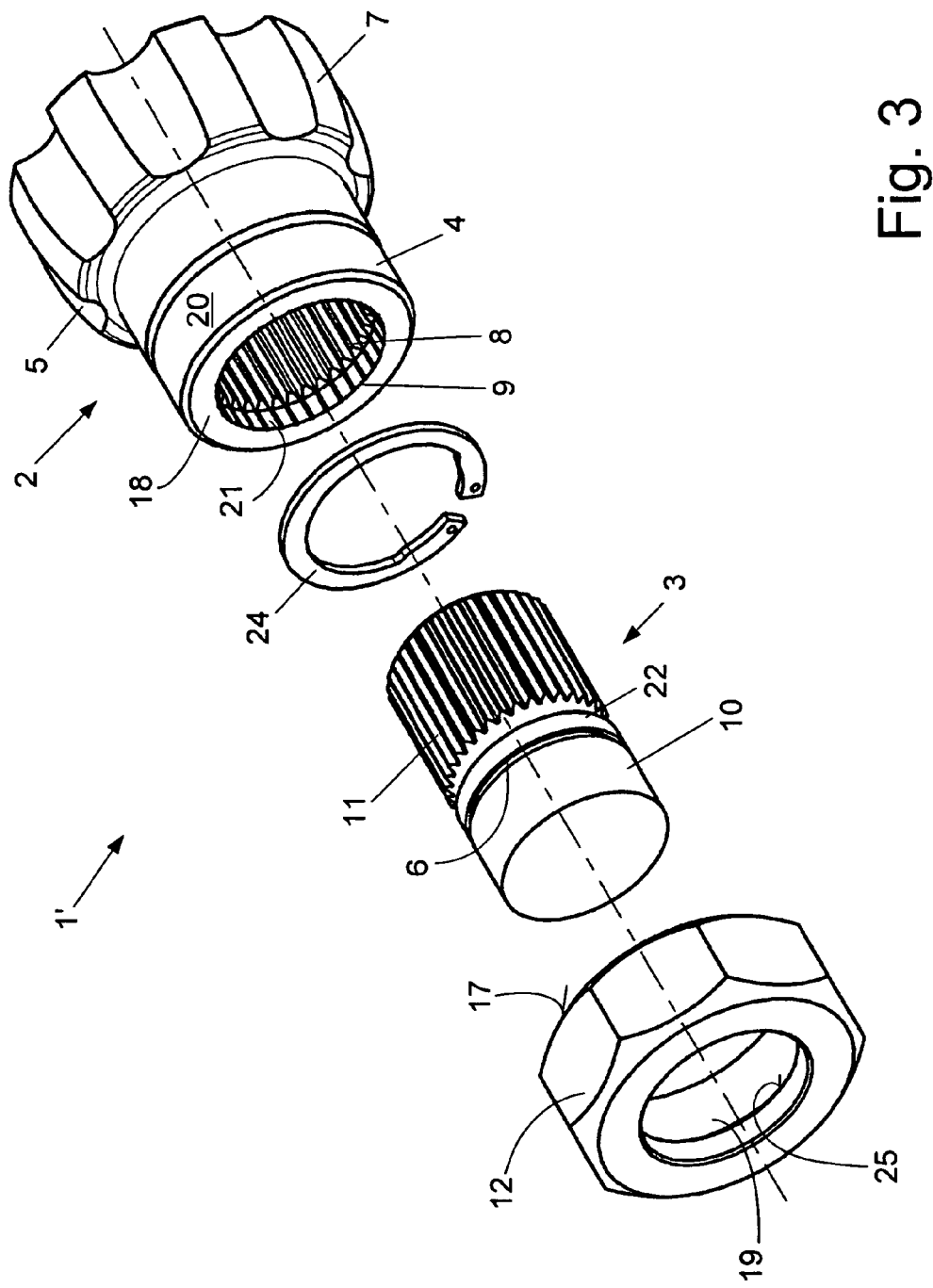
Figure 4:
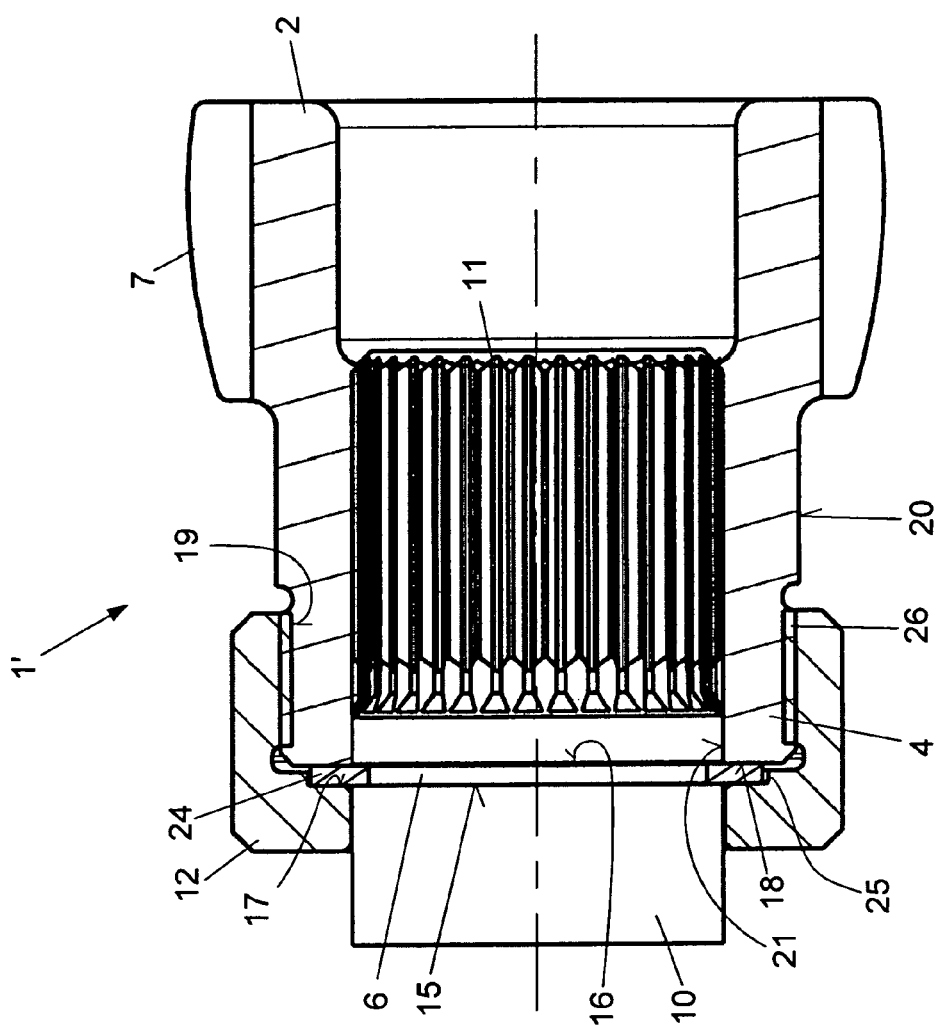

Appended to the description for clarification of the invention is a drawing in which:

FIG. 1 shows a first exemplary embodiment of a connecting device according to the invention in a perspective view, FIG. 2 shows a device according to FIG. 1 in the assembled state in longitudinal section with a first circlip, FIG. 3 shows a second exemplary embodiment of a device according to the invention similar to that in FIG. 1 but with a second circlip, and FIG. 4 shows the device according to FIG. 3 in the assembled state in longitudinal section.

Accordingly, FIGS. 1 to 4 show a device 1, 1' for the rotationally fixed connection of a coupling inner part 2 of a drive coupling of a motor vehicle drive shaft to a drive-effective pin 3 of a gearbox. In these exemplary embodiments the articulated body is in the form of a coupling hub or coupling inner part 2 which has on a track portion 7 axially oriented tracks 5 for rolling bodies (not shown) of the drive coupling. Axially opposite thereto the coupling inner part 2 has a connecting portion 4 which will be described in more detail below.

For connection to the pin 3, shown partially schematically, of a transmission (not further illustrated) of the motor vehicle, the coupling inner part 2 has a central hollow-cylindrical opening 9 which is provided with profiling in the form of an internal axial toothing 8 for transmission of torque. In order to establish the drive train connection, the coupling inner part 2 can be fitted axially onto the pin 3, which has an outer axial toothing 11 corresponding to the inner axial toothing 8. The propeller shaft can be installed in the finished state with the drive coupling (not completely illustrated) and connected to the gearbox at the drive-engine end when said propeller shaft is fastened to the pin 3.

No later than shortly before the pin 3 is inserted into the central opening 9 of the coupling inner part 2, a circlip and then a bushing 12 is fitted onto a displacement portion 10 of the pin 3. According to a first exemplary embodiment in FIGS. 1 and 2, the circlip is in the form of an O-ring 13 and, according to the second exemplary embodiment of FIGS. 3 and 4, in the form of a Seeger ring 24 with a rectangular cross-sectional profile. The smallest bore diameter of the bushing 12 corresponds to, or is slightly greater than, the diameter of the pin 3, or of the displacement portion 10 thereof.

The bushing 12 is first pushed as far as possible onto a displacement portion 10 of the pin 3 and the circlip 13 is slid onto the pin 3 until it snaps into a comparatively shallow circumferential groove 6, 14 in the pin 3, which marks the axial end of the displacement portion 10. The circlip 13, 24 functions with its opposite sides 15 and 16 as an axial stop for an end face 17 of an axial opening 25 of the bushing 12 oriented toward the coupling inner part 2, and for an end face 18 of the coupling inner part 2 (FIGS. 2 and 4).

After the circlip 13, 24 has been fitted to the pin 3 and is fixed in the circumferential groove 6, 14, the coupling inner part 2 is slid onto the pin 3 until the end face 18 of the coupling inner part 2 abuts the side 16 of the circlip 13, 24 oriented in this direction. In this way the correct axial distance between the coupling inner part 2 and the pin 3 is already established and a torque transmission is made possible. The bushing 12 is then slid in the direction of the coupling inner part 2, so that the captive axial connection between the pin 3 and the coupling inner part 2 can be produced.

For this purpose, in the exemplary embodiment illustrated in FIGS. 3 and 4, the bushing 12 has on its inner cylindrical surface 19 an internal thread shown in FIG. 4 which corresponds to an external thread in the outer cylindrical surface 20 of a connecting portion 4 of the coupling inner part 2. FIG. 4 shows this threaded connection 26 in longitudinal section. The bushing 12 is therefore in the form of a screw socket which is screwed onto the coupling body 4.

In deviation from the exemplary embodiment represented in FIG. 3, however, it is also possible to provide the inner cylindrical surface 19 of the bushing 12 and the outer cylindrical surface 20 of the coupling inner part 2 with other mutually corresponding connecting means. For example, it is possible to form bayonet connections, snap-in connections or press-fit surfaces on the bushing 12 and the coupling body 4.

The circlip 13 shown in FIGS. 1 and 2 is in the form of a metal spring ring, so that it can be easily slid onto the pin 3 and snap into the circumferential groove 14. However, it is also possible for the circlip 13 to be configured differently. Such an alternative configuration is represented in FIGS. 3 and 4, which show an inventive device 1' which corresponds largely to the device 1 represented in FIG. 1 and use the same reference numerals for identical parts.

The configuration of the device 1' according to FIG. 3 differs from that according to FIG. 1 essentially by a different variant of the circlip, which here is in the form of a Seeger ring 24 and engages in a correspondingly shaped circumferential groove 6 of the pin 3. A geometrically adapted recess 25 corresponding to the outer shape of the Seeger ring 24 is formed in the bushing 12, so that, when the bushing 12 and the coupling inner part 2 are in axial abutment with the Seeger ring 24, the correct axial spacing of the two parts with respect to one another is established. In order to ensure a certain tolerance, the circlip 13, 24 may be made of an elastomeric material.

As FIGS. 2 and 4 make clear, the groove 6, 14 in the pin 10 is not very deep, in order to reduce the mechanical strength of the pin 10 as little as possible with predefined dimensions and material properties. Preferably, the circumferential groove 6, 14 is formed only so deep that it accommodates less than half the radial extension of the material of the circlip 13, 24. In order to prevent the circlip 13, 24 from slipping out of this shallow circumferential groove 6, 14, the opening 25 of the bushing 12 is adapted geometrically in such a manner that the circlip 6, 14 is received therein completely on its radially outer side, and at least partially in the axial direction.

References

1 Device
1' Device
2 Articulated body; coupling inner part of a drive coupling
3 Pin
4 Connecting portion of coupling inner part
5 Track of coupling inner part
6 Circumferential groove
7 Track portion of coupling inner part
8 Internal axial toothing of coupling inner part
9 Hollow-cylindrical opening of coupling inner part
10 Displacement portion of pin
11 External axial toothing of pin
12 Bushing
13 Circlip, O-ring
14 Circumferential groove
15 Side of circlip
16 Side of circlip
17 End face of bushing
18 End face of coupling inner part
19 Inner cylindrical surface of bushing
20 Outer cylindrical surface of coupling inner part
21 Inner cylindrical surface of coupling inner part
24 Circlip, Seeger ring
25 Opening in bushing
26 Threaded connection, thread

The invention claimed is:

1. A device (1, 1') for a rotationally fixed connection of a drive-effective pin (3) of a gearbox to an articulated body (2) of a drive coupling of a drive shaft comprising:
a pin (3) exhibiting an outer external toothing (11);
an articulated body (2) exhibiting an internal axial toothing (8) in a hollow cylindrical opening (9), wherein the outer external toothing (11) and the internal axial toothing (8) correspond to each other and are able to mesh with one another, an axially displaceable bushing (12) arranged on the pin (3), wherein the axially displaceable bushing (12) makes possible an axial securing of the articulated body (2) and the pin (3), which bushing (12) can be positioned or fastened to a remote track connecting portion (4) of the articulated body (2), wherein a radially inner cylindrical surface (19) of the bushing (12) and a radially outer cylindrical surface (20) of the articulated body (2) are connected force matchingly or shape matchingly,
wherein the pin (3) has a displacement portion (10) and an end portion with the external axial toothing (11),
a circumferential groove (6, 14) formed between the displacement portion (10) and the external axial toothing (11),
wherein a radial inner side of a circlip (13, 24) is arranged in the circumferential groove (6, 14);
wherein a radial depth of the circumferential groove (6, 14) in the pin (3) is smaller than half a radial extension of a material of the circlip (13, 24),
wherein a radial outer side of the circlip is directly abutted on a first axial side directed away from the connecting portion of the articulated body by an end face of the bushing directed towards the connecting portion of the articulated body and on an oppositely disposed second axial side directed towards the connecting portion by an end face of the articulated body.

2. The device as claimed in claim 1, wherein the radially inner cylindrical surface (19) of the bushing (12) and the radially outer cylindrical surface (20) of the articulated body (2) are each provided with a mutually corresponding thread (26).

3. The device as claimed in claim 1, wherein the radially inner cylindrical surface (19) of the bushing (12) and the radially outer cylindrical surface (20) of the articulated body (2) are each provided with a mutually corresponding bayonet connection.

4. The device as claimed in claim 1, wherein the radially inner cylindrical surface (19) of the bushing (12) and the radially outer cylindrical surface (20) of the articulated body (2) are connected to one another by a press-fit connection which can be released non-destructively by an application of a large force.

5. The device as claimed in claim 1, wherein the circlip (13, 24) is in the form of a spring ring, a Seeger ring or an O-ring.

6. The device as claimed in claim 5, wherein the circlip (13, 24) has an angular or round cross section.

7. The device as claimed in claim 1, wherein the articulated body (2) is formed as an articulated outer part of the drive coupling.

8. A device (1, 1') for a rotationally fixed connection of a drive-effective pin (3) of a gearbox to an articulated body (2) of a drive coupling of a drive shaft comprising:
a pin (3) exhibiting an outer external toothing (11);
an articulated body (2) exhibiting an internal axial toothing (8) in a hollow cylindrical opening (9), wherein the outer external toothing (11) and the internal axial toothing (8) correspond to each other and are able to mesh with one another,
an axially displaceable bushing (12) arranged on the pin (3), wherein the axially displaceable bushing (12) makes possible an axial securing of the articulated body (2) and the pin (3), which bushing (12) can be positioned or fastened to a remote track connecting portion (4) of the articulated body (2),
wherein a radially inner cylindrical surface (19) of the bushing (12) and a radially outer cylindrical surface (20) of the articulated body (2) are connected force matchingly or shape matchingly,
wherein the pin (3) has a displacement portion (10) and an end portion with the external axial toothing (11),
a circumferential groove (6, 14) formed between the displacement portion (10) and the external axial toothing (11),
a radial inner side of a circlip (13, 24) arranged in the circumferential groove (6, 14);
wherein a radial depth of the circumferential groove (6, 14) in the pin (3) is smaller than half a radial extension of a material of the circlip (13, 24), wherein a radial outer side of the circlip is directly abutted on a first axial side directed away from the connecting portion of the articulated body by an end face of the bushing directed towards the connecting portion of the articulated body and on an oppositely disposed second axial side directed towards the connecting portion by an end face of the articulated body.

9. The device (1, 1') according to claim 8, further comprising
a geometrically adapted circular recess opening (25) disposed in and open on one axial side of the bushing (12) for seating the circlip (13, 24) and wherein the geometrically adapted circular recess opening (25) corresponds to the outer shape of the circlip (13, 24) and is formed in the bushing (12) such that, when the bushing (12) and the connecting portion (4) are in axial abutment with the circlip (13, 24), a correct axial spacing of the bushing (12) with respect to the connecting portion (4) is established.

10. The device (1, 1') according to claim 8, wherein the circlip (13, 24) is received and embedded completely on its radially outer side, and at least partially in the axial direction, in a geometrically adapted circular recess opening (25) disposed in and open on one axial side of the bushing (12), wherein the geometrically adapted circular recess opening (25) is an annular recess in the bushing (12) surrounding the groove (6, 14).

11. A device (1, 1') comprising:
a central hollow-cylindrical opening (9);
an internal axial toothing (8) disposed in the hollow-cylindrical opening (9);
a connecting portion (4);
an outer cylindrical surface (20) disposed on the connecting portion (4) and having an external thread;
an end face (18) of the connecting portion (4), wherein the hollow cylindrical opening (9), the internal axial toothing (8), the connecting portion (4), and the end face (18) of the connecting portion (4) form a coupling inner part (2) of a drive shaft;
a drive-effective cylindrical pin (3) of a gearbox having a first end portion and a displacement portion (10);
an external axial toothing (11) furnished on the second end portion of the cylindrical pin (3), wherein the second end portion of the cylindrical pin (3) is inserted into the central hollow cylindrical opening (9) of the coupling inner part (2);
wherein the external axial toothing (11) and the internal axial toothing (8) are mutually corresponding;
wherein the external axial toothing (11) and the internal axial toothing (8) are form matching and are able to mesh with one another;
a circumferential groove (6, 14) disposed on the cylindrical pin (3) between the displacement portion (10) and the external axial toothing (11);
a radial inner side of a circlip (13, 24) disposed in the circumferential groove (6, 14);
an axially displaceable bushing (12) freely movable on the displacement portion (10), wherein a smallest bore diameter of the bushing (12) corresponds to a constant diameter of the cylindrical pin (3), wherein the bushing (12) has the form of a screw socket screwed onto the connecting portion (4);
wherein an axial securing of the coupling inner part (2) and the cylindrical pin (3) is performed by having the axially displaceable bushing (12) arranged on the displacement portion (10), wherein the bushing (12) is fastened to the connecting portion (4) of the coupling inner part (2);
a radially inner cylindrical surface (19) of the bushing (12) with an inner thread and the radially outer cylindrical surface (20) of the connecting portion (4) with an outer thread are provided with a fastening by engaging threads (26);
a first axial side of the circlip directed away from the internal axial toothing (8);
a second axial side (16) of the circlip (13, 24) which is directed toward the internal axial toothing (8);
wherein the end face (18) of the connecting portion (4) is directly axially abutting with the second axial side (16) of a radial outer side of the circlip (13, 24) directed toward the internal axial toothing (8), wherein the radial depth of the circumferential groove (6, 14) in the cylindrical pin (3) is less than half the radial extension of the material of the circlip (13, 24),
a geometrically adapted circular recess opening (25) disposed in and open on one axial side of the bushing (12) for seating the circlip (13, 24) and wherein the geometrically adapted circular recess opening (25) corresponds to the outer shape of the circlip (13, 24) and is formed in the bushing (12) such that, when the bushing (12) and the connecting portion (4) are in axial abutment with the circlip (13, 24), then a correct axial spacing of the bushing (12) with respect to the connecting portion (4) is established, wherein the circlip (13, 24) is received and embedded completely on its radially outer side, and at least partially in the axial direction, in the geometrically adapted circular recess opening (25) of the bushing (12), wherein the circular recess opening (25) is an annular recess in the bushing (12) surrounding the groove (6, 14),
an end face (17) of the geometrically adapted circular recess opening (25) of the bushing (12), and wherein the first axial side (15) of the radial outer side of the circlip (13, 24) directly abuts the end face (17) disposed in the geometrically adapted circular recess opening (25) of the bushing (12).

12. A device (1, 1') comprising:
a cylindrical pin (3) disposed on an axis;
a bushing (12) disposed on the axis;
a circlip (13, 24) disposed on the axis;
a coupling inner part (2) disposed on the axis;
wherein the cylindrical pin (3), the bushing (12), the circlip (13, 24), and the coupling inner part (2) are disposed in sequence;
wherein the cylindrical pin (3) is a drive-effective cylindrical pin (3) of a gearbox having a displacement portion forming a first end portion and having a second end portion directed toward the coupling inner part (2);
wherein an inner circumferential groove (6, 14) is disposed on an outside of the cylindrical pin (3) between the displacement portion (10) and the second end portion of the cylindrical pin (3);
wherein an external axial toothing (11) is furnished on the second end portion of the cylindrical pin (3);
wherein the bushing (12) is axially displaceable and freely movable on the displacement portion (10), wherein a smallest bore diameter of the bushing (12) corresponds to or is slightly greater than a diameter of the cylindrical pin (3), wherein the bushing (12) has the form of a screw socket screwed onto a connecting portion (4) of the coupling inner part (2), wherein the bushing (12) has an inner cylindrical thread (19);

wherein the circlip (13,24) has an outer diameter larger than the diameter of the cylindrical pin (3) and has an inner diameter smaller than the diameter of the cylindrical pin (3);

wherein an end ring face (17) of the bushing (12) directed towards the coupling inner part (2) is disposed perpendicular to the axis and has an inner diameter slightly larger than the diameter of the cylindrical pin (3) and has an outer diameter larger than the outer diameter of the circlip (13, 24) or of the circular recess (25) of the bushing (12) corresponding to the outer diameter of the circlip (13,24);

wherein an inner rim of the circlip (13, 24) is disposed in the circumferential inner groove (6, 14);

wherein a first axial side (15) at a radial outer side of the circlip (13, 24) is directed away from the coupling inner part (2) and abuts the end ring face (17);

wherein the first axial side (15) of the circlip (13, 24) is directed toward the first end portion of the pin (3);

wherein a second axial side (16) at the radial outer side of the circlip (13, 24) is directed toward the second end portion of the cylindrical pin (3) and abuts an axial end face (18) of the connecting portion (4) and wherein the second axial side (16) of the circlip (13, 24) is directed toward the coupling inner part (2);

wherein the radial depth of the inner circumferential groove (6, 14) in the cylindrical pin (3) is less than half the radial extension of the material of the circlip (13, 24);

wherein an outer cylindrical surface (20) is disposed on the connecting portion (4) and has an external thread;

wherein a radially inner cylindrical surface (19) of the bushing (12) has an inner thread and the radially outer cylindrical surface (20) of the connecting portion (4) with an outer thread are fastened to each other by engaging threads (26);

wherein the coupling inner part (2) has a central hollow-cylindrical opening (9);

wherein an internal axial toothing (8) is disposed in the hollow-cylindrical opening (9);

wherein the hollow cylindrical opening (9), the internal axial toothing (8), the connecting portion (4), and the end face (18) of the connecting portion (4) form a coupling inner part (2);

wherein the second end portion of the cylindrical pin (3) is inserted into the central hollow cylindrical opening (9) of the coupling inner part (2);

wherein the external axial toothing (11) and the internal axial toothing (8) are mutually corresponding;

wherein the external axial toothing (11) and the internal axial toothing (8) are form matching and are able to mesh with one another;

wherein an axial securing of the coupling inner part (2) and of the cylindrical pin (3) is performed by having the axially displaceable bushing (12) arranged on the displacement portion (10), wherein the bushing (12) is fastened to the connecting portion (4) of the coupling inner part (2).

\* \* \* \* \*